United States Patent [19]
Piper

[11] 3,844,687
[45] Oct. 29, 1974

[54] FLEXIBLE MOUNTING SYSTEM
[76] Inventor: James Piper, 1159 Fountain Way, Anaheim, Calif. 92630
[22] Filed: Apr. 4, 1973
[21] Appl. No.: 347,897

[52] U.S. Cl. ................................ 417/301, 417/363
[51] Int. Cl. ...................... F04b 17/00, F04b 35/04
[58] Field of Search .................... 417/363, 423, 301; 415/501; 237/8

[56] References Cited
UNITED STATES PATENTS

| | | | |
|---|---|---|---|
| 2,177,795 | 10/1939 | Von Delden | 417/363 |
| 2,291,346 | 7/1942 | Robinson | 417/363 |
| 2,412,110 | 12/1946 | Williams, Jr. | 237/8 |
| 2,915,978 | 12/1959 | Schaefer | 417/363 |
| 2,973,716 | 3/1961 | Thomas | 415/119 |
| 3,422,766 | 1/1969 | Conibeer | 417/301 |

FOREIGN PATENTS OR APPLICATIONS
597,553  8/1945  Great Britain ...................... 417/363

*Primary Examiner*—William L. Freeh
*Attorney, Agent, or Firm*—Lyon & Lyon

[57] ABSTRACT

A flexible system for mounting a pump in a continuously circulating, potable hot water system having Teflon bellows isolating the pump from the remainder of the hot water system. The pump and motor assembly is mounted on a plate which is, in turn, supported on springs having low spring rates. Further, the inlet and outlet pipes of the hot water system are rigidly fixed relative to one another at a point isolated from the pump by the bellows. Moreover, the inlet and outlet pipes approach the bellows along center lines which are coincident.

14 Claims, 4 Drawing Figures

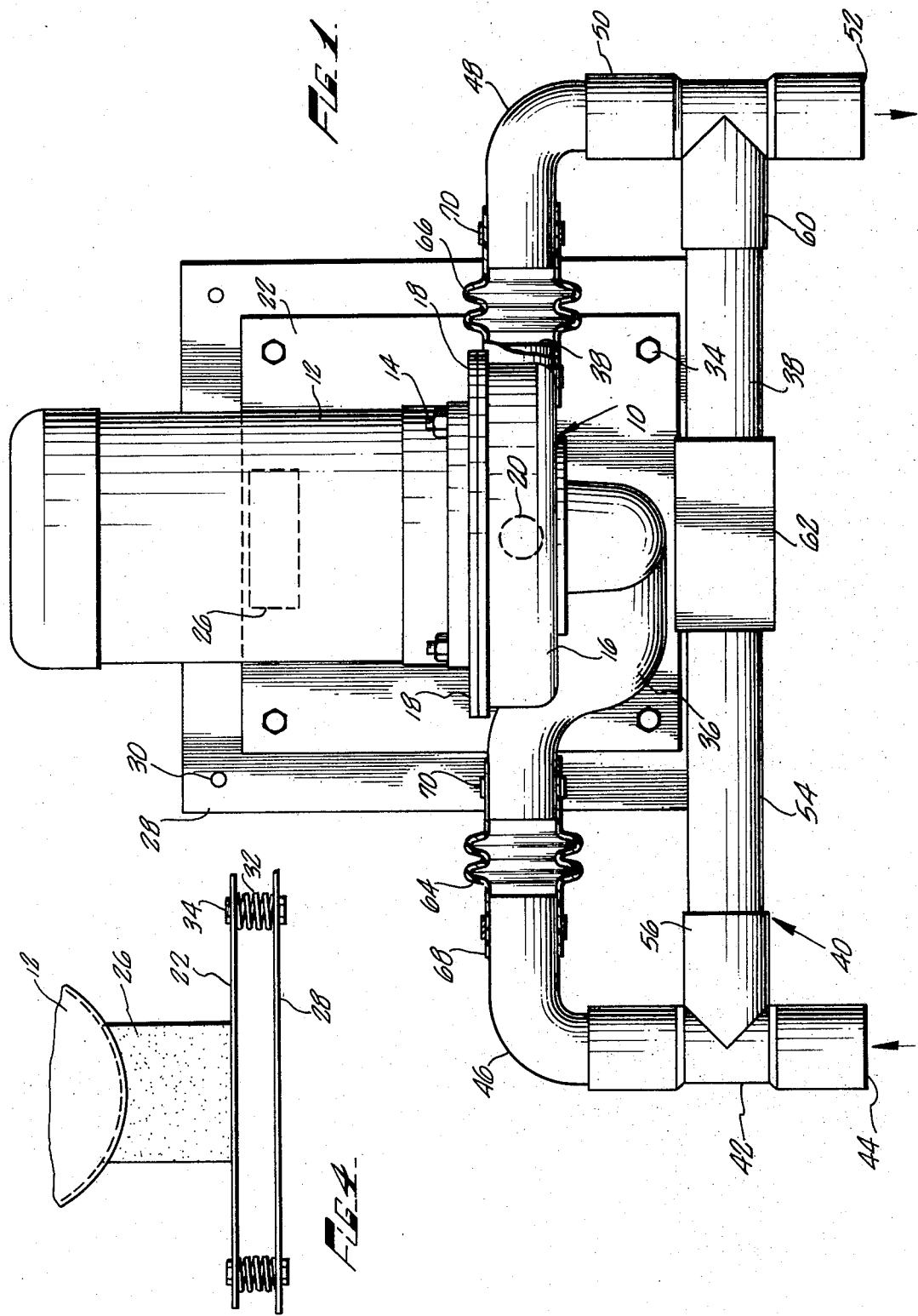

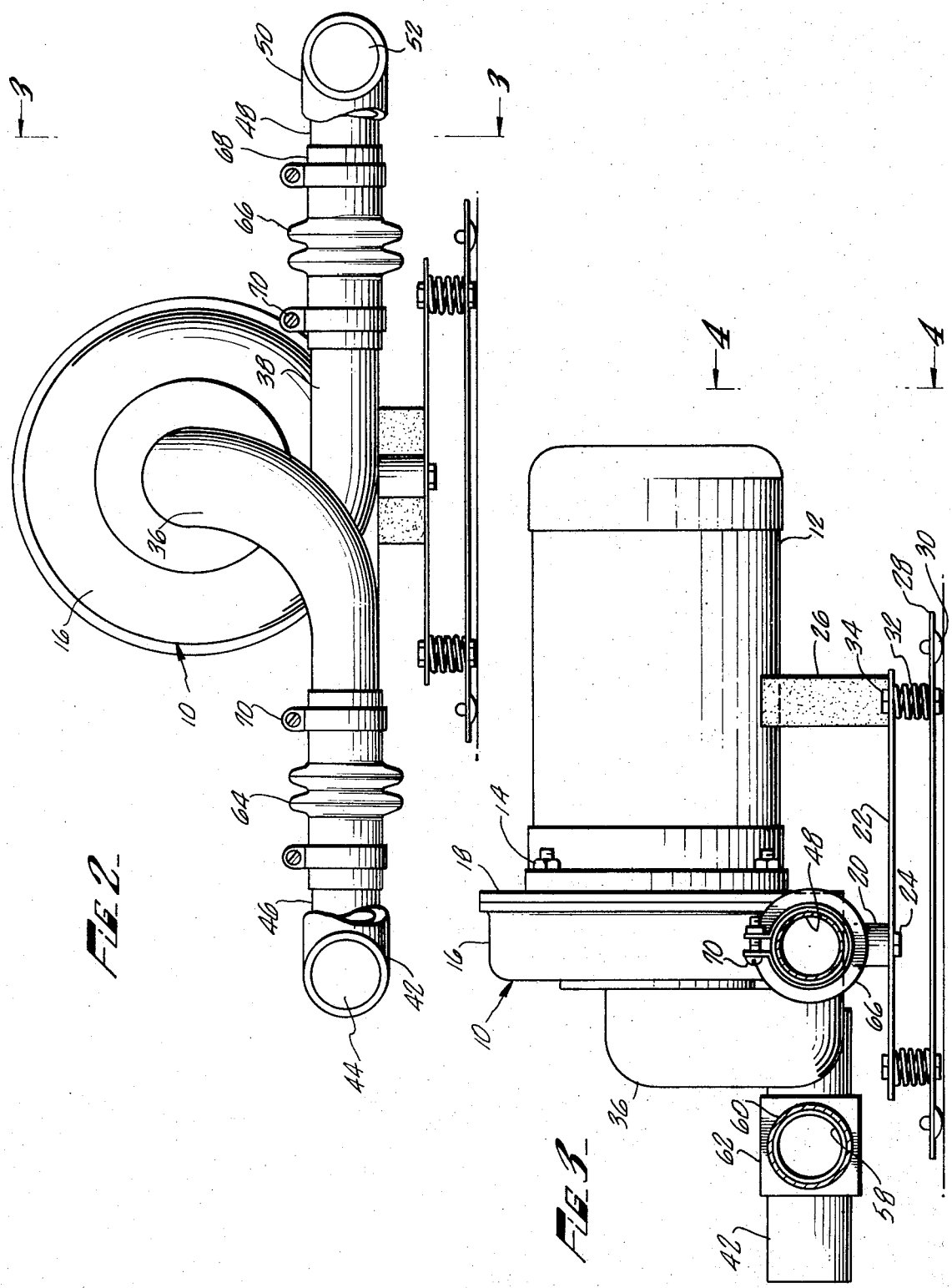

FLEXIBLE MOUNTING SYSTEM

This invention generally relates to a plumbing system including a pump for circulating water. More specifically, this invention is directed to a means for incorporating a pump into a continuously circulating, potable hot water system to eliminate vibration and noise.

Continuously circulating, potable hot water systems have been developed for buildings as a source of both heat and hot tap water. These systems include pumps which operate to continuously circulate the water. Such a system is disclosed in the Piper U.S. Pat. No. 3,526,361. The included pumps have been connected through conventional plumbing materials to these systems. As a result, some vibration and noise is transmitted from the pump through the system. To avoid substantial noise problems, low speed pumps have been employed. The employment of low speed pumps necessitates the use of low speed, high torque motors which are comparatively expensive. Reduction gearing arrangements which are also expensive may be employed.

The use of conventional flexible coupling materials to isolate the pump have generally not been practical with a potable hot water system. Metal bellows have a tendency to transmit sound and vibration because of their relatively high modulus of elasticity. Further, such bellows often corrode and/or fail under the vibratory loads imposed. Moreover, flexible couplings have also not proven practical because of their tendency to permit organic growth, wear our and fail, or introduce impurities and taste characteristics to the system. Because of these disadvantages, most building codes preclude the use of such flexible couplings within such systems. Further, such flexible systems have not been able to withstand the vibration associated with conventional pump mountings. Consequently, the practical solution to noise vibration problems associated with the use of pumps within such potable hot water systems has been to employ expensive pump equipment to eliminate noise and vibration at its source.

The present invention contemplates a flexible system for mounting pumps within potable hot water systems which is acceptable for use within such systems, provides vibration and noise isolation of the pumps and further insures the structural integrity of the flexible couplings.

Thus, an object of the present invention is to provide a flexible system for mounting a pump in a continuous circulation, potable hot water system.

A second object of the present invention is to provide a flexible pump mounting system which isolates the noise and vibration of the pump from the associated plumbing system.

Another object of the present invention is to provide a flexible pump mounting system which allows the use of comparatively inexpensive high speed, low torque pumps and motors.

A further object of the present invention is to provide a pump mounting system including plumbing fittings having a low modulus of elasticity which are compatable with a potable water system.

Another object of the present invention is to provide a flexible pump mounting system including flexible fittings between the pump and the associated plumbing system which isolates the noise and vibration from the associated plumbing system and the supporting structure for the pump without subjecting the fittings to destructive vibration and loads.

Thus, a flexible pump mounting system is provided which provides isolation of noise and vibration associated with the pump and motor assemblies from the associated plumbing systems, provides flexible plumbing fittings which are acceptable for potable water systems, and provides for the structural support of the entire assembly of the pump and the associated plumbing to prevent damage to the flexible plumbing fittings. Further objects and advantages will become apparent from the description herein.

FIG. 1 is a top view of the pump and flexible pump mounting system illustrating the flexible fittings in cross-section.

FIG. 2 is a front view of the present invention further illustrating the support for the pump and motor assembly.

FIG. 3 is a cross-sectional view taken along line 3—3 of FIG. 2 illustrating a side-view of the system.

FIG. 4 is a detail of the back of the system showing the rear mount.

Turning specifically to FIG. 1, a pump 10 is assembled to a motor 12 by means of fasteners 14. The pump 10 is provided with a housing 16 and a back plate 18. This configuration allows the motor 12, the back plate 18 and the impellar located within the volute of the housing 16 to be removed without dismanteling the plumbing. A boss 20 as best shown in FIGS. 2 and 3 is cast with the housing 16. The boss 20 forms the forward support for the motor and pump assembly. The pump and motor assembly, in the present embodiment, has a speed of 3,450 R.P.M. This assembly is substantially noiser and substantially cheaper than 1,750 R.P.M. assemblies of the same quality. Naturally, the more expensive assembly may be employed when desired.

A sheet metal base 22 is provided beneath the motor and pump assembly. The boss 20 is fastened directly to the sheet metal base 22 by a bolt 24 positioned through the sheet metal base 22. A rubber mount 26 is fixed to the sheet metal base 22 near the back edge of the base. The rubber mount 26 can best be seen in FIGS. 3 and 4. The rubber mount 26 has a curved upper surface in order that the case of the motor 12 will fit directly onto the rubber mount 26. Thus, the boss 20 and rubber mount 26 support the motor and pump assembly on the sheet metal base 22. The positioning of the motor and pump assembly on the sheet metal base 22 may be determined so that the center of gravity of the assembly will be located above the geometric center of the sheet metal base 22. When the motor and pump assembly is so positioned, a relatively equal distribution of the load will be effected on the four supports for the sheet metal base 22. To accomplish this centering of the unit, the rubber mount 26 may be centered on the base 22 near the back edge. The rubber mount 26 will then accommodate the motor at any point along the motor housing. The bolt 24 is then positioned through the sheet metal base 22 along the center line of the base 22 toward the front portion thereof at a point which will best place the center of gravity of the unit.

A second base plate 28 is conveniently provided beneath the sheet metal base 22. The base plate 28 is positioned directly onto the building. The base plate 28 may be conveniently larger than the sheet metal base 22 so as to provide easy access to the mounting positions 30 near the four corners of the base plate 28.

Means are provided for flexibly supporting the sheet metal base 22 on the base plate 28. Four coil springs 32, mounted near the four corners of the sheet metal base 22, are used to support the sheet metal base 22 on the base plate 28 in this embodiment. The coil springs 32 have a spring rate or approximately 25 pounds. This allows the springs 32 to absorb some of the vibration which would otherwise be transmitted to the building. The springs 32 are retained in position by means of fasterners 34.

An inlet 36 is provided at one side of the housing 16. The inlet is directed to the center of the pump 10 where the incoming water is directed to the impellar. The outlet 38 receives the effluent from the volute. The inlet 36 and outlet 38 have coincident axes. This in line arrangement of the inlet 36 and outlet 38 helps prevent unequal loadings and resulting torques on the flexible couplings.

The pumping system receives and distributes water to the building plumbing through the manifold generally designated 40. The manifold 40 receives incoming water from the building plumbing at an inlet tee 42. Inlet tee 42 is rigidly coupled with the building plumbing at a conventional plumbing joint provided at inlet 44. The influent is then directed across the tee to an elbow 46. The tee 42 and the elbow 46 provide an inlet conduit for directing influent toward the inlet 36 of the pump 10. A similar configuration is provided for the outlet 38. An elbow 48 receives effluent directed from the outlet 38 and conducts it to an outlet tee 50. Outlet tee 50 then directs the water to outlet 52 where a rigid, conventional plumbing joint is provided with the building plumbing. The joints between the inlet and outlet tees 42 and 50 and the elbow 46 and 48 are also accomplished by conventional plumbing methods. The leg of each tee 42 and 50 is oriented so as to have coincident axes. A pipe 54 is positioned within the leg 56 of the inlet tee 42. A similar pipe 58 is threaded into leg 60 of the outlet tee 50.

A check valve 62 is coupled with pipes 54 and 58. The check valve 62 provides a bypass for the pump 10 which may be employed when the pump 10 is not functioning. The check valve 62 may be manually controlled or pressure activated by the back pressure which would develop in the case of pump failure.

Naturally, such a check valve arrangement would be unnecessary in a single pump system. However, the check valve arrangement provides a rigid link between the inlet and outlet systems which prevents relative movement between the inlet elbow 46 and the outlet elbow 48. This rigid link provided by the tees 42 and 50, the pipes 54 and 58 and the check valve 62 may be accomplished by other means when such a by-pass system as above disclosed is not necessary or desired. Such a rigid system may be accomplished by the building when the incoming and outgoing plumbing is rigidly fixed with respect to the building. When the plumbing is not so fixed, a collar arrangement may be employed about each of the inlet and outlet systems. A tie rod positioned between the collars and rigidly fixed thereto would serve as a link instead of the pipes 54 and 58 and the check valve 62.

Means for coupling the inlet elbow 46 with the inlet 36 and means for coupling the outlet 38 and the outlet elbow 48 may be provided by flexible bellows 64 and 66. The inlet bellows 64 and the outlet bellows 66 are essentially identical. Each set of bellows 64 and 66 includes collars 68 which extend over the ends of the elbows 46 and 58, the inlet 36 and the outlet 38. Conventional clamps 70 are provided about each collar 68 to clamp the collars 68 to the respective fitting. The bellows of the flexible coupling means 64 and 66 are located between each pair of collars 68.

The flexible coupling means 64 and 66 are most advantageously made from a flexible material having a low modulus of elasticity. Flexible members having a low modulus of elasticity act to prevent the transmission of vibrations and noise which otherwise is readily transmitted through rigid plumbing systems. Synthetic resin polymers sold under the trademark Teflon have been found most practical in this application because of its low modulus of elasticity, its compatability with potable water systems and its resistence to heat and corrosion.

Thus, an arrangement is provided which incorporates a pump and motor assembly within a plumbing system where the pump 10 and motor 12 are isolated from both the plumbing system and the building structure for purposes of vibration and noise attenuation. The Teflon bellows 64 and 66 operate to provide a conduit for the passage Of water and at the same time act as a barrier to sound and vibration. The coil springs 32 having a low spring rate also operate to limit vibration transmission to the building structure. The present invention further inhibits vibration by rigidly fixing the manifold arrangement 40. As a result of these noise and vibration limiting features, a higher speed pump and motor assembly may be employed.

The arrangement of the present invention also provides a system which is capable of handling the pressures and temperatures of a hot water system within a building. Utility water pressure may run from 30 to 100 P.S.I. The pump pressure as presently contemplated for such systems is around 10 to 12 P.S.T. The hot water system for most domestic purposes runs approximately 150°. The Teflon bellows 64 and 66 are able to withstand these pressures and temperatures for substantial periods of time such that they are practical for use in buildings where longevity of the plumbing is expected.

The structural arrangement of the present system further enhances the longevity of the bellows 64 and 66. The pump and motor assembly is securely positioned on the sheet metal base 22 by the boss 20 and the rubber mount 26. The coil springs 32 are relatively short and thereby limit lateral movement of the sheet metal base 22 with respect to the base plate 28. Further, the manifold structure 40 is rigidly constructed to provide a fixed distance between the ends of the elbows 46 and 48. It is contemplated that the plumbing system attached to the manifold 40 is fixed relative to the building structure and will not cause a shift in the manifold with respect to the pump and motor assembly which is also positioned on the building structure. Thus, the manifold 40 is fixed relative to the base plate 28. The pump and motor assembly is constrained to vibrate within fixed amplitudes limited by the flexibility of the springs 32. The bellows 64 and 66 are designed to permit greater relative movement between the pump and motor assembly and the manifold 40 than is permitted by the coil springs 32. This prevents damage to the flexible couplings. Also, the inlet 36 and outlet 38 of the pump 10 have coincident axes which helps prevent unequal loadings and resulting torques on the bellows 64 and 66.

While embodiments and applications of the invention have been shown and described, it would be apparent to those skilled in the art that many more modifications are possible without departing from the inventive concepts herein described. The invention, therefore, is not to be restricted except as is necessary by the prior art and by the spirit of the appended claims.

I claim:

1. A flexible system for mounting a pump in a continuously circulating, potable hot water system for a building comprising
    an inlet conduit;
    an outlet conduit, said outlet conduit terminating at a point which is a fixed distance from the end of said inlet conduit;
    a rigid link between said inlet and said outlet conduits to prevent relative movement therebetween;
    means for flexibly coupling said inlet and outlet conduits to the pump, said coupling means having a low modulus of elasticity such that no efficient sound transmitting path is provided between the pump and said inlet and outlet conduits; and
    a flexible support means for mounting the pump to the building, said flexible support means being of greater rigidity than said flexible coupling means to insure that said coupling means will not exceed their elastic limit.

2. The system of claim 1 wherein said coupling means includes
    a first bellows positioned between said inlet conduit and the pump; and
    a second bellows positioned between the pump and said outlet conduit.

3. The system of claim 1 wherein said coupling means is Teflon.

4. The system of claim 2 wherein said first and said second bellows have mutually coincident centerlines.

5. The system of claim 1 wherein said rigid link provides a conduit between said inlet conduit and said outlet conduit and thereby forms a by-pass to the pump.

6. The system of claim 5 wherein said rigid link further includes a check valve.

7. A flexible system for mounting a pump in a continuously circulating, potable hot water system for a building comprising
    an inlet and outlet manifold terminating at predetermined locations near the pump; thereof
    flexible bellows providing the sole couplings between the pump inlet and outlet and said rigid manifold, said flexible bellows being aligned such that the centerlines thereof are coincident; and
    means for flexibly constraining the vibrations of the pump to prevent damage to said flexible bellows, said flexible constraining means being of greater rigidity than said bellows to insure that said bellows will not exceed their elastic limit.

8. The system of claim 7 wherein said bellows are Teflon.

9. The system of claim 7 wherein said manifold includes
    a by-pass means capable of allowing flow through said manifold without passing through the pump.

10. The system of claim 9 wherein said by-pass retains said manifold as a rigid structure.

11. A flexible pump system for a continuously circulating, potable hot water system in a building, comprising
    a pump;
    an inlet conduit connected to the hot water system;
    an outlet conduit, said outlet conduit terminating at a point which is a fixed distance from the end of said inlet conduit said inlet and said outlet conduits being aligned such that the centerlines thereof are coincident;
    means for flexibly coupling said inlet conduit and said outlet conduit to said pump, said coupling means consisting of two bellows having a low modulus of elasticity, said bellows being acceptable for use in a potable water system; and
    a flexible support means for mounting said pump to the building, said flexible support means having sufficient rigidity to constrain the amplitude of pump vibration to a level which will cause said flexible coupling means not to exceed their elastic limit.

12. The system of claim 11, wherein said first and second bellows are Teflon.

13. The system of claim 11 wherein said pump system further comprises a rigid link between said inlet and said outlet conduits to prevent relative movement therebetween.

14. The system of claim 13 wherein said rigid link provides a conduit between said inlet conduit and said outlet conduit which thereby forms a by-pass to said pump.

* * * * *